Dec. 9, 1958  C. AMBRETTE ET AL  2,863,404
ALIMENTARY PASTE PRODUCING APPARATUS
Filed May 11, 1956  2 Sheets-Sheet 1
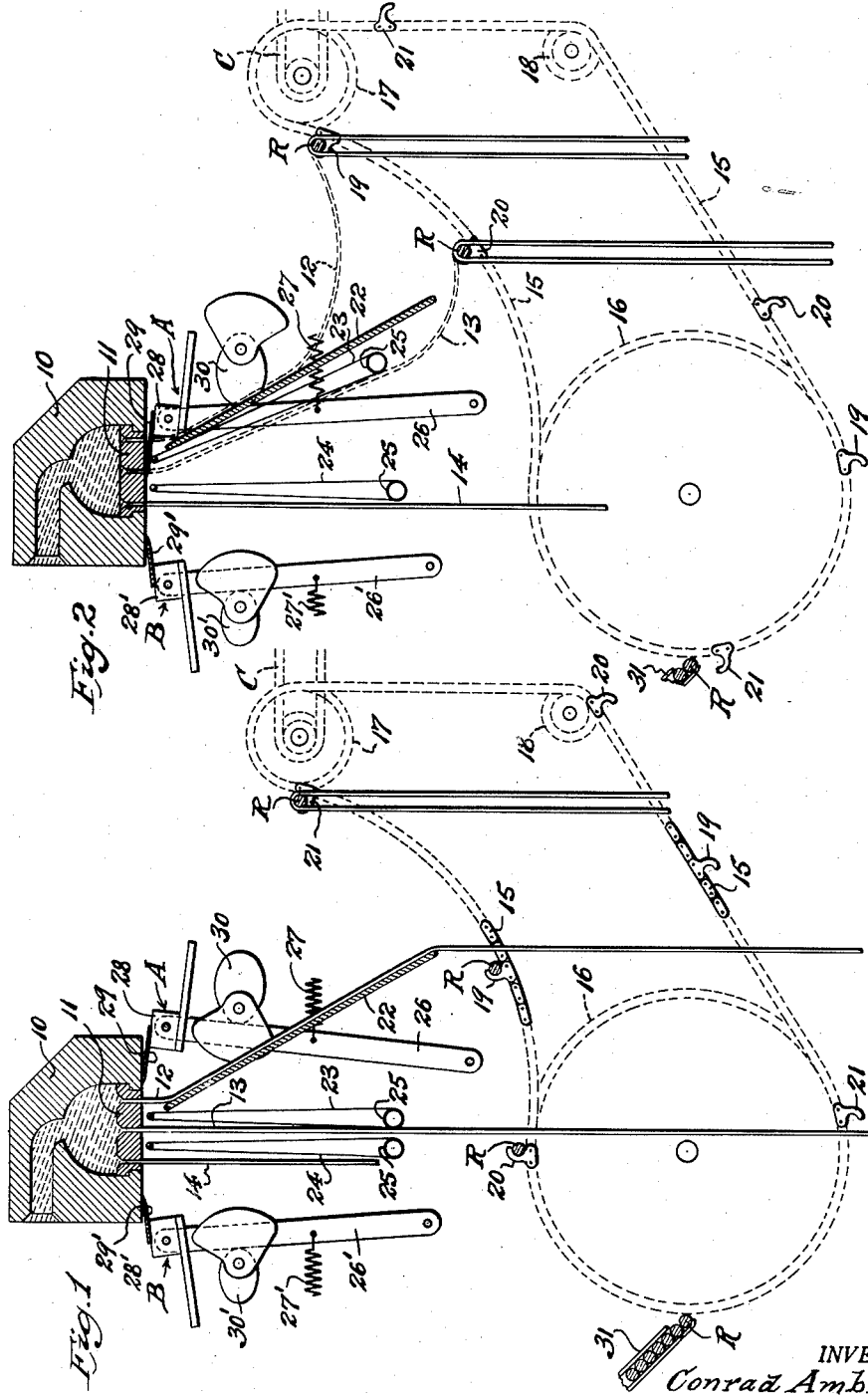
INVENTORS:
Conrad Ambrette &
BY Paul Ambrette,
Richards & Cifelli,
Attorneys Dec. 9, 1958  C. AMBRETTE ET AL  2,863,404
ALIMENTARY PASTE PRODUCING APPARATUS
Filed May 11, 1956  2 Sheets-Sheet 2
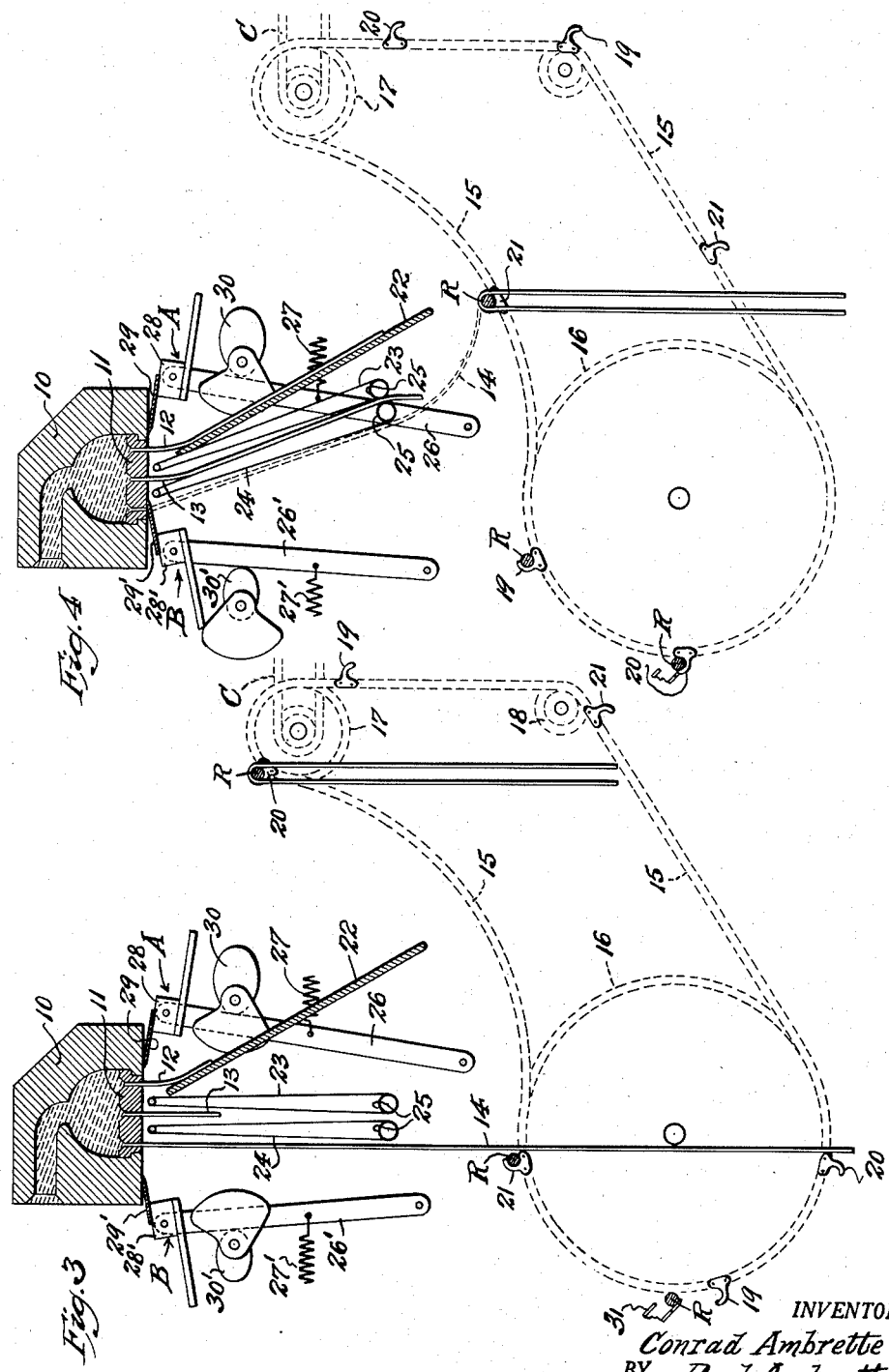
INVENTORS:
Conrad Ambrette &
BY Paul Ambrette,
Richards & Cifelli,
Attorneys ns
2,863,404

ALIMENTARY PASTE PRODUCING APPARATUS

Conrad Ambrette and Paul Ambrette, Westbury, N. Y.

Application May 11, 1956, Serial No. 584,345

2 Claims. (Cl. 107—14)

This invention relates to apparatus for producing alimentary paste products, such as spaghetti, macaroni and the like, and has reference, more particularly, to improvements in apparatus for such purpose of the type and kind disclosed by United States Letters Patent 2,481,275, wherein means is provided for extruding alimentary paste through a forming die, and thereupon mounting the extruded paste strings upon conveyer advanced rack rods for delivery thereby to drier apparatus, all in a continuous automatic manner.

This invention has for an object to improve apparatus of the aforesaid patented type, whereby to increase its output capacity without substantially increasing its size and floor space occupancy, and without necessity for accelerating the emission speed of paste strings from the die, which, if unduly increased, risks burning or other deleterious effect impairing the quality of the product.

The invention has for a further object to provide, in combination, an elongated die having its paste string extrusion apertures arranged in three parallel, closely spaced rows, a rack rod conveyer means to carry suitably spaced apart leading rack rods and a trailing rack rod rearwardly spaced therefrom, a first paste string cut off mechanism operative upon the first and second rows of extruded paste strings, and a second paste string cut off mechanism operative upon the rearward third row of extruded paste strings; means being provided to deflect the forward first row of paste strings to dispose dependent portions thereof in forwardly spaced apart relation to dependent portions of the second row of paste strings, so that the dependent portions of said first and second rows of paste strings are respectively positioned to lie in the path of the respective leading rack rods carried by the conveyer means, and in such relation to each other that adequate clearance space is provided for the drop of cut ends of said first row of paste strings over the first rack rod and between the latter and the second rack rod, while the dependent portions of the rearward third row of paste strings will be positioned to lie in the path of the trailing rack rod carried by the conveyer means; means being also provided for successively operating said first and second cut off mechanisms and the rack rod conveyer means in coordinated timed relation.

The above and other objects will become apparent from a reading of the following detailed description of this invention in connection with the accompanying drawings, in which:

Fig. 1 is a schematic vertical sectional view, showing a rack rod conveyer means in its idle or intermittent dwelling position, and the first and second rows of extruded paste strings disposed ready to be respectively taken up by the respective leading rack rods carried by said conveyer; Fig. 2 is a similar view showing the conveyer in advancing movement, and the first cut off mechanism actuated whereby the first and second rows of extruded paste strings are released for reception and suspension by the leading rack rods; Fig. 3 is also a similar view showing the conveyer still in advancing movement, and the third row of extruded paste strings disposed ready to be taken up by the trailing rack rod carried by the conveyer; and Fig. 4 is another similar view showing further advancing movement of the conveyer, and the second cut off mechanism actuated whereby by the third row of extruded paste strings is released for reception and suspension by the trailing rack rod.

In the several figures of the drawings, like characters of reference indicate corresponding parts. Referring to said drawings, the reference character 10 indicates a chambered die housing to which alimentary paste, under extruding pressure, is suitably supplied. Supported by said housing, at the bottom thereof, is an elongated die 11 which is provided with at least three laterally spaced, longitudinally extending parallel and closely spaced rows of die extrusion apertures, from which a forward first row 12 of paste strings, a second row 13 of paste strings, and a third row 14 of paste strings are discharged for downward extension from the die.

Disposed beneath the die housing and its die is a rack rod loading and conveyer mechanism by means of which the rows of paste strings issuing from the die 11 are automatically looped over rack rods advanced by the conveyer mechanism for carriage by the latter to drier apparatus (not shown). This conveyer mechanism, as in the apparatus disclosed by the hereinabove identified Patent 2,481,275, comprises laterally opposed and aligned, synchronously operated, endless conveyer chains 15, which are spaced apart so as to permit rows of paste strings issuing from the die 11 to descend therebetween. Each conveyer chain is driven by a drive sprocket 16 of relatively large diameter, and the advancing upper course of said chain extends in a catenary curve, upwardly from the drive sprocket to and over a carrier sprocket 17, with the return course of said chain preferably passing back to the drive sprocket over a suitably disposed guide sprocket 18. Affixed to each conveyer chain 15 are one or more groups of rack rod supporting hooks, each group thereof comprising first and second hooks 19 and 20; which are more widely spaced apart than is the relatively close spacing of the first and second rows of paste strings at the die emission level thereof, and a trailing hook 21 which is spaced behind the second hook 20 at a distance substantially greater than the spacing distance between the first and second hooks 19 and 20. The rack rod hooks of one chain which correspond to those of the other chain are disposed in transverse alignment, whereby the same can engage and support rack rods in bridging disposition between and across the conveyer chains.

Extending from the discharge end of the advancing upper courses of the conveyer chains 15, to receive paste string loaded rack rods therefrom, is a conveyer means C adapted to deliver said loaded rack rods to drier apparatus (not shown).

Suitably supported to extend from a point adjacently below the die 11, and intermediate the first and second rows 12 and 13 of the paste strings issuing from the latter, downwardly and forwardly to a point adjacently above and intermediate the ends of upper courses of the conveyer chains 15, is an oblique deflector plate 22. This deflector plate is adapted to engage the first row 12 of paste strings issuing from the die, whereby to so guide the descent thereof that their dependent lower end portions will be forwardly spaced away and separated from the dependent lower end portions of the second row 13 of paste strings issuing from the die at a distance corresponding to the distance which separates the first and second rack rod supporting hooks 19 and 20 of the conveyer means, whereby to simultaneously dispose the lower end portions of said respective rows of paste strings adjacently in advance of respective rack rods supported by said hooks 19 and 20, and so as to provide clearance space through which the cut ends of the first row of paste strings can drop between the leading rack rods.

Pivotally suspended to depend from points adjacently below the die 11, and respectively intermediate the first and second rows 12 and 13 and the second and third rows 13 and 14 of paste strings issuing from said die, are respective apron loops 23 and 24. These apron loops are preferably made of a light weight textile fabric, and are each preferably expanded at their lower free ends by an inserted cylindrical or tubular spreader member 25, said aprons being of widths somewhat in excess of the lengths of the paste string rows. The lower ends of said aprons terminate above and in suitably spaced relation to the rack rod carrying course of the conveyor. These aprons function to separate and thus prevent inter-mingling or interentanglement of the rows of extruded paste strings, between which they are respectively interposed, as said paste strings descend from the die 11.

Automatically actuated means are provided for cutting away from the die 11, at proper times, the rows of paste strings issued therefrom. Such means comprises a forward cutting mechanism A adapted to substantially simultaneously cut away the first and second rows 12 and 13 of the paste strings, and a rearward cutting mechanism B adapted to subsequently cut away the third row 14 of the paste strings. Each cutting mechanism comprises laterally opposed cutter blade supporting and actuating means respectively located adjacent to but externally of opposite ends of the rows of paste strings to be operated upon thereby, with the cutter blade supported in bridging extension therebetween, and so as to operatively contact and cooperate with the bottom face of the die 11 during its cutting action.

By way of illustration, the laterally opposed cutter blade supporting means of the forward cutting mechanism A each comprise a pivoted lever 26, which is yieldably retracted in an initial position by suitable spring means 27, and pivotally mounted upon the upper end of said lever 26 is a carrier block 28 to which an end of a cutter blade 29 is affixed, whereby said cutter blade is disposed in bridging extension between said opposite supporting means. The bridging cutter blade 29 is normally uptilted so that its cutting edge engages the under face of the die 11. A rotatable cam 30 is disposed to engage at least one of the levers 26, said cam being operative to oscillate the lever whereby to effect forward cutting and retraction strokes of the cutter blade 29. This cam 30 is so dimensioned as to induce a cutting stroke of the cutter blade 29 of sufficient length to successively cut through both of the forward rows 12 and 13 of extruded paste strings.

Similarly, the laterally opposed cutter blade supporting means of the rearward cutting mechanism B each also comprise a pivoted lever 26', which is yieldably retracted to an initial position by spring means 27', and pivotally supported upon the end of said lever 26' is a carrier block 28' to which an end of a cutter blade 29' is affixed, so that said cutter blade is disposed in bridging extension between said opposite supporting means. The bridging cutter blade 29' is also normally uptilted to engage its cutting edge with the under face of the die 11. A rotatable cam 30' is disposed to engage at least one of the levers 26' so as to oscillate the same to effect forward cutting and retraction strokes of the cutter blade 29'. Said cam 30' is so dimensioned as to limit the cutting stroke of the cutter blade 29' to a distance which cuts only through the rearward row 14 of extruded paste strings.

Supported adjacent to the conveyor mechanism, adjacent to a point where the chains 15 thereof begin their advancing rack rod carrying courses, is a rack rod delivery chute 31, the discharge end of which inclines downwardly so as to terminate adjacent to the conveyor mechanism, whereby to position a lowermost rack rod R in the path of movement of approaching rack rod engaging hooks of the conveyor chains 15. The rack rod R is picked up by said hooks, and supported thereby in transverse extension between the conveyor chains, so as to be carried forward by the advancing movement of the latter.

The rack rod conveyor mechanism is intermittently operated in timed relation to the rates of emission of paste strings from the die 11, said paste strings being continuously emitted from the latter. The conveyor mechanism is brought to rest, so as to remain stationary in position to dispose rack rods R, which are supported and spaced apart by the first and second hooks 19 and 20, respectively adjacently behind the simultaneously forming first row 12 and second row 13 of paste strings emitted from the die. Said first and second rows 12 and 13 of paste strings, due to timed alternated operation of the cutting mechanisms A and B, are simultaneously completed in advance of the completion of the rearward third row 14 of the paste strings. Owing to the interposition of the deflector plate 22 between the descending first and second rows 12 and 13 of paste strings, descent of the first row 12 thereof will be caused to forwardly diverge relative to the second row thereof, whereby the dependent lower portions of said first row will be forwardly spaced so as to offset from the dependent lower portions of the second row conformably to the distance separating the first and second rack rod supporting hooks 19 and 20 of the conveyor mechanism, while nevertheless these rows of paste strings will remain close together at the discharge face of the die 11, so that the same can be both substantially simultaneously cut away from said die by actuated operation of a single cutting mechanism A (see Fig. 1).

By the time the first and second emitted rows 12 and 13 of the paste strings are completed as to length, a conveyer control means operates to start forward movement of the rack rod carrying course thereof, whereby rack rods supporting hooks 19 and 20 will be moved forward to respectively engage the approximate midpoints of the dependent paste strings of respective rows 12 and 13 thereof, thus to permit looping of said strings over said respective rack rods carried by hooks 19 and 20. After these paste string engaging rack rods are advanced to a desired point, the cutting mechanism A is timed to operate, whereby its cutter blade 29 is advanced and retracted to successively but nevertheless substantially simultaneously cut away said paste strings from the die 11, whereupon the trailing upper end portions thereof drop behind the respective rack rods supported by the hooks 19 and 20, thus looping the paste strings over these rack rods for suspension therefrom (see Fig. 2).

In the meantime, by the continued advancing movement of the conveyer mechanism, the trailing hook 21 has picked up a rack rod R, and has advanced the same to a position behind the forming third row 14 of paste strings (see Fig. 3), which has been completed by the time this rack rod reaches the point of engagement therewith. The continuing advancing cycle of the conveyer mechanism loops said third row of paste strings over said trailing rack rod, and after sufficient progress of the advance of the same beyond the die 11, the cutting mechanism B is timed to operate, whereby the cutter blade 29' is advanced and retracted to cut away said third row 14 of paste strings from the die 11, so that the trailing upper end portions of said paste strings can drop behind the rack rod carried by the hooks 21, thus looping said paste strings over said rack rod for suspension therefrom (see Fig. 4).

The conveyer mechanism continues its operative movement until rack rod supporting hooks 19 and 20 of a succeeding group of hooks arrive in position behind subsequent forming rows 12 and 13 of paste strings, whereupon the conveyer mechanism is automatically stopped to idle or dwell until formation of the latter is completed, whereafter the above described cycle of operations is repeated.

The above described rack rod loading and conveyer mechanism and the related paste string cut off operations may be coordinately controlled, as e. g. by electromechanical control means of the general character disclosed in the heretofore referred to prior United States Patent 2,481,275.

From the above description it will now be apparent that by reason of the novel spaced relation of the forward rack rod supporting hooks 19 and 20, and the provision for cooperation therewith of the deflector plate 22 intermediate the forward first and second rows 12 and 13 of paste strings emitted from the die 11, said rows 12 and 13 are so separated that, upon cutting away thereof from the die, their trailing end portions can drop over the respective receiving rack rods without interference of one row with the other, while at the same time said rows 12 and 13 remain close together, at their points of emission from the die, so as to be adapted to be substantially simultaneously cut away from the latter by the single cutting mechanism A. Furthermore, the trailing hooks 21 of the conveyer mechanism are so rearwardly spaced at substantial distance relative to the forward hooks 19 and 20 that adequate time is allowed for formation and pick up of the third row 14 of paste strings after the loading of the forward first and second rows 12 and 13 of paste strings upon their supporting rack rods has been completed. As a result of such improved construction, the capacity of output of the apparatus, as compared with that of the before mentioned United States Patent 2,481,275, has been increased fifty percent, and this without substantially increasing the size of the apparatus or the area of floor space occupancy required for its installation, or without necessity for increasing the speed of emission of paste strings from the die, which, if unduly increased, may result in impairment of the quality of the product.

Having now described our invention, we claim:

1. In apparatus for loading paste strings extruded from a die onto rack rods advanced by a driven conveyer passing beneath the die, cut off mechanism being provided for cutting away the paste strings dependent from the die, and means to actuate the cut off mechanism and the conveyer means in coordinated timed relation, the combination therewith wherein the die is provided with at least three parallel, closely spaced rows of paste string extrusion openings, the conveyer is provided with rack rod pick-up means to support and advance leading rack rods, which are spaced apart a distance substantially greater than the distance separating the first and second rows of paste strings at the die extrusion openings, and a trailing rack rod spaced behind said leading rack rods, and the cut off mechanism comprises a first cut off mechanism operative upon the forward first and second rows of extruded paste strings and a second cut off mechanism operative upon the rearward third row of extruded paste strings, a stationary deflector plate inclining downwardly and forwardly toward the conveyer from a point adjacent the die and intermediate the first and second rows of paste strings extruded therefrom, whereby to guide the descending first row of paste strings to a position spaced forwardly of the second row of paste strings a distance approximating the spaced apart relation of the leading rack rods advanced by the conveyer, thus to dispose midportions of the paste strings of respective first and second rows thereof across the paths of advance by the conveyer of respective leading rack rods, while the rearward third row of paste strings will be positioned to lie across the path of advance by the conveyer of the trailing rack rod, and means for successively operating said first and second paste string cut off mechanisms, the widely spaced relation of the leading rack rods being such as to provide clearance for drop of the cut ends of the first row of paste strings between the leading rack rods.

2. In apparatus for loading paste strings extruded from a die onto rack rods advanced by a driven conveyer passing beneath the die, cut off mechanism being provided for cutting away the paste strings dependent from the die, and means to actuate the cut off mechanism and the conveyer means in coordinated timed relation, the combination therewith wherein the die is provided with at least three parallel, closely spaced rows of paste string extrusion openings, the conveyer is provided with rack rod pick-up means to support and advance leading rack rods, which are spaced apart a distance substantially greater than the distance separating the first and second rows of paste strings at the die extrusion openings, and a trailing rack rod spaced behind said leading rack rods, and the cut off mechanism comprises a first cut off mechanism operative upon the forward first and second rows of extruded paste strings and a second cut off mechanism operative upon the rearward third row of extruded paste strings, a stationary deflector plate inclining downwardly and forwardly toward the conveyer from a point adjacent the die and intermediate the first and second rows of paste strings extruded therefrom, whereby to guide the descending first row of paste strings to a position spaced forwardly of the second row of paste strings a distance approximating the spaced apart relation of the leading rack rods advanced by the conveyer, thus to dispose midportions of the paste strings of respective first and second rows thereof across the paths of advance by the conveyer of respective leading rack rods, while the rearward third row of paste strings will be positioned to lie across the path of advance by the conveyer of the trailing rack rod, means to actuate the first paste string cut off mechanism after the first and second rows of extruded paste strings are engaged by the forwardly moving leading rack rods advanced by the conveyer, and means to actuate the second paste string cut off mechanism after the third row of extruded paste strings is engaged by the forwardly moving trailing rack rod advanced by the conveyer, the widely spaced relation of the leading rack rods being such as to provide clearance for drop of the cut ends of the first row of paste strings between the leading rack rods.

References Cited in the file of this patent

UNITED STATES PATENTS

| | | |
|---|---|---|
| 2,223,352 | De Francisci | Dec. 3, 1940 |

FOREIGN PATENTS

| | | |
|---|---|---|
| 691,069 | Germany | May 16, 1940 |